US00RE34755E

United States Patent [19]

Eng et al.

[11] E Patent Number: Re. 34,755

[45] Reissued Date of Patent: Oct. 11, 1994

[54] INTERCONNECT FABRIC PROVIDING CONNECTIVITY BETWEEN AN INPUT AND ARBITRARY OUTPUT(S) OF A GROUP OF OUTLETS

[75] Inventors: Kai Y. Eng, Middletown; Mark J. Karol, Fair Haven; Yu S. Yeh, Freehold, all of N.J.

[73] Assignee: AT&T Bell Laboratories, Murray Hill, N.J.

[21] Appl. No.: 940,425

[22] Filed: Sep. 4, 1992

Related U.S. Patent Documents

Reissue of:

[64] Patent No.: 4,955,016
Issued: Sep. 4, 1990
Appl. No.: 400,184
Filed: Aug. 29, 1989

[51] Int. Cl.[5] ..... H04L 12/56; H04Q 11/04

[52] U.S. Cl. ..... 370/60; 370/94.1

[58] Field of Search ..... 370/58.1, 60, 60.1, 370/65.5, 94.1; 340/825.5, 825.51, 825.79, 825.8

[56] References Cited

U.S. PATENT DOCUMENTS

| | | | |
|---|---|---|---|
| 4,577,308 | 3/1986 | Larson et al. | 370/60 |
| 4,623,996 | 11/1986 | McMillen | 370/60 |
| 4,630,257 | 12/1986 | Larson et al. | 370/60 |
| 4,630,260 | 12/1986 | Toy et al. | 370/60 |
| 4,706,240 | 11/1987 | Payne, III | 370/60 |
| 4,730,305 | 3/1988 | Acampora et al. | 370/60 |
| 4,754,451 | 6/1988 | Eng et al. | 370/60 |
| 4,760,570 | 7/1988 | Acampora et al. | 370/60 |
| 4,837,761 | 6/1989 | Isono et al. | 370/60 |
| 5,008,878 | 4/1991 | Ahmadi et al. | 370/60 |
| 5,065,394 | 11/1991 | Zhang | 370/60 |
| 5,148,428 | 9/1992 | Lee | 370/60 |

OTHER PUBLICATIONS

C-L Wu et al., "On a Class of Multistage Interconnection Networks", *IEEE Connections on Computers*, vol. C-29, No. 8, Aug. 1980, pp. 694–702.

IEEE Transactions on Communications, vol. 36, No. 6, Jun. 1988, "Design of a Broadcast Packet Switching Network", J. S. Turner, pp. 734–743.

*Primary Examiner*—Alpus H. Hsu
*Attorney, Agent, or Firm*—Thomas Stafford

[57] ABSTRACT

This invention is an inventive N input by L output interconnect fabric. In operation, packets comprising an information field and an address are received at the N inputs to the interconnect fabric, and the address in each packet is mapped to a group of outputs, rather than to any particular output. Each packet is then routed to any available one of the interconnect fabric outputs associated with the group to which the packet is mapped. If a number of packets destined for the same group simultaneously arrive at the interconnect fabric inputs and the group to which they are all destined does not comprise enough outputs to accept them, then all packets in excess of the number that the destined group can accept are simply discarded. The probability of lost [jackets] *packets* due to such discarded packets is acceptably small. In one exemplary embodiment, the invention can be utilized to build arbitrarily large packet switches.

12 Claims, 5 Drawing Sheets

INTERCONNECT FABRIC PROVIDING CONNECTIVITY BETWEEN AN INPUT AND ARBITRARY OUTPUT(S) OF A GROUP OF OUTLETS

Matter enclosed in heavy brackets [ ] appears in the original patent but forms no part of this reissue specification; matter printed in italics indicates the additions made by reissue.

CROSS-REFERENCE TO RELATED APPLICATION

U.S. patent application Ser. No. 400,183 and filed concurrently herewith, *now U.S. Pat. No. 4,955,017.*

BACKGROUND OF THE INVENTION

1. Field of the Invention

The present invention relates to an interconnect fabric providing connectivity between an input and arbitrary output(s) of a group of outputs.

2. Description of the Prior Art

The internal components of a packet switch often operate several times faster than the rate at which the packet switch receives or transmits packets. This speed of operation is necessary to enable the packet switch to route different packets, simultaneously received at multiple inputs, to the same output. However, such a high speed of operation requires that the packet switch be implemented on a single integrated circuit chip or a single circuit card, and, thus, the number of inputs and outputs which a packet switch can comprise is limited by the number of inputs and outputs which can be placed on a circuit chip or a circuit card. One packet switch which overcomes the problem in some regard is disclosed in U.S. Pat. No. 4,577,308, issued to Larson et al. on Mar. 18, 1986. In this packet switch, several outputs are multiplexed by an on-chip multiplexer, and the multiplexed output signal is sent off the chip by means of a single output lead. Similarly, a multiplexed input stream is received at a single input pin of the chip, and an on chip demultiplexer demultiplexes the signal and supplies the separated input signals to separate inputs of the packet switch. Although this overcomes some of the difficulties of prior art devices, it requires on-chip multiplexing/demultiplexing, and, therefore, the allowable size of the packet switch is still limited. The problem that remains is to provide a packet switch which can be modularly grown as large as an expanding network may require.

SUMMARY OF THE INVENTION

The foregoing problem in the prior art has been solved in accordance with the present invention which relates to a packet switching arrangement formed by interconnecting a plurality of J-input by K-output, small sized packet switches, designated output packet switches, to separate outputs of an inventive N-input by L-output interconnect fabric, where $N<L>J$. The NXL interconnect fabric can accept concurrent packets at its N inputs from external sources and selectively forward such packets to separate ones of its L outputs. The L outputs of the interconnect fabric are grouped into predetermined subsets of J outputs each. Each subset of J outputs can then be, for example, coupled to J inputs of a separate one of the plurality of JXK output packet switches to form a packet switching arrangement. Each of the K outputs of an output packet switch is arranged to transmit packets received from the interconnect fabric to, for example, a different destination equipment. In an exemplary operation, packets. each comprising an information field and a destination address, arrive at the interconnect fabric. Based upon its destination address, each packet is routed to any one of the inputs of a particular group of interconnect fabric outputs and then to the particular output packet switch which has the destination equipment of the packet connected to one of its K outputs. If more than J packets destined for the group of interconnect fabric outputs arrive simultaneously at the inputs to the interconnect fabric, all packets in excess of J are lost, since each group of interconnect fabric outputs only includes J outputs and can, therefore, only accept a maximum of J simultaneously arriving packets. The probability of this loss however, is sufficiently small to be acceptable in practical systems. This design method of discarding excess packets has been termed The Generalized Knockout principle. In a more general embodiment, the output packet switches may be replaced with one or more other types of user equipment, making the interconnect fabric useful for other applications as detailed hereinafter. It should also be obvious that if the discarding of excess packets is absolutely not allowable, then additional buffering can be provided to temporarily store these excess packets.

DETAILED DESCRIPTION

Figure 1:
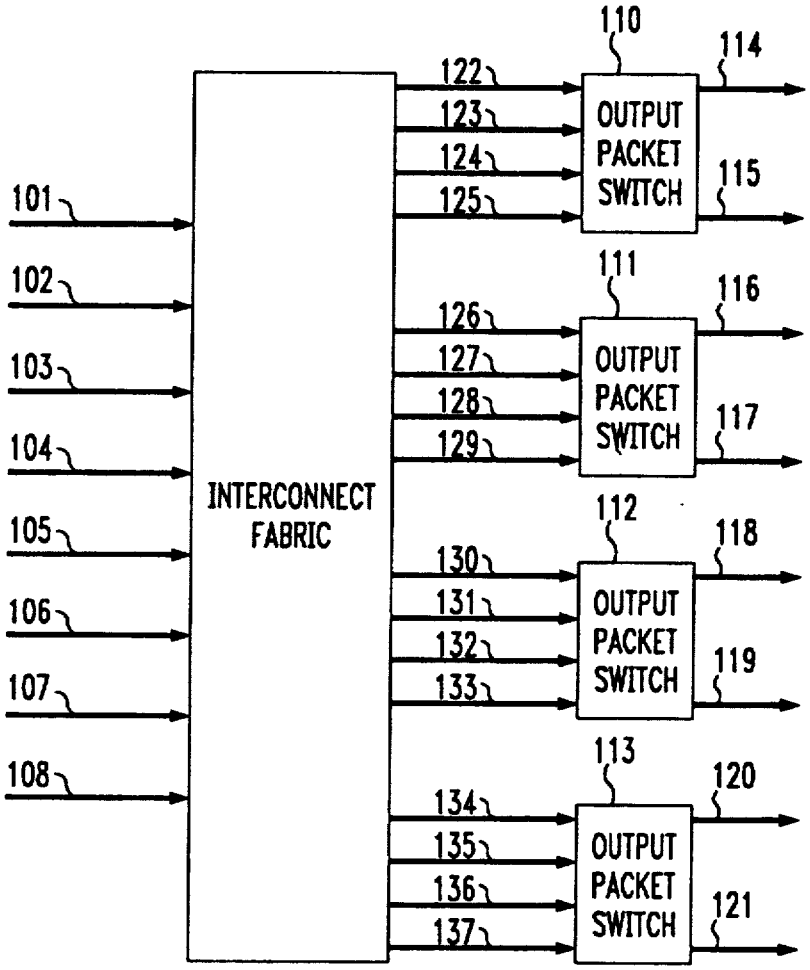
FIG. 1 shows a block diagram of an exemplary packet switching arrangement using the present interconnect fabric in accordance with the invention.

FIG. 1 shows a block diagram of an exemplary implementation of a packet switching arrangement utilizing the present invention comprising (1) an interconnect fabric 109 including (i) a plurality of 8 interconnect fabric inputs 101–108, and (ii) a plurality of 16 interconnect fabric outputs 122–137, grouped into subsets of 4 interconnect fabric outputs each; i.e. interconnect fabric outputs 122–125, and (2) a plurality of 4 output packet switches 110–113, each including (i) a plurality of 4 output packet switch inputs, and (ii) a plurality of 2 switch outputs; i.e. switch outputs 114–115 of output packet switch 110. Each output packet switch is arranged to receive data packets from a separate subset of the interconnect fabric outputs as shown in FIG. 1, and route such packets to either one of the two outputs which are connected to possibly separate end user devices. The present interconnect fabric is being described for use in a packet switching arrangement as discussed in copending application Ser. No. 400,183, filed on the same day as the present application for the present inventors. It is to be understood that such description of the present interconnect fabric is for purposes of illustration only, and that the present interconnect fabric can be used in other switching arrangements. It is to be further understood that in the description hereinafter, any references to inputs to an output packet switch also should be interpreted as designating the particular group of interconnect fabric outputs associated with that output packet switch.

In operation, packets arrive simultaneously, during predetermined time slots, at interconnect fabric inputs 101–108 and are read into interconnect fabric 109. Interconnect fabric 109 determines, from the destination address in each packet, which subset of interconnect fabric outputs 122–137; i.e. which output packet switch, each of the packets is destined for, with several packets possibly being destined for the same subset of outputs; i.e. subset 122–125 of FIG. 1. However, each packet is routed to a separate one of the interconnect fabric outputs 122–137. If several packets are destined for the same switch output, i.e. switch output 114, or, if several packets are destined for different switch outputs of the same output packet switch, i.e. switch outputs 114 and 115 of output packet switch 110, each of these packets is routed to a separate input of that packet switch by means of a separate one of associated subset of interconnect fabric outputs 122–137. The interconnect fabric 109 is considered novel in that previously known interconnect fabrics would examine the address in the arriving packet and uniquely map that address to a particular single output. In this regard, see the article "Design of a Broadcast Packet Switching Network" in IEEE Transactions on Communications, Vol. 36, No. 6, June 1988, by J. S. Turner, which describes a switching fabric for use in a broadcast system. Present interconnect fabric 109, however, maps the address in each packet to a subset of several interconnect fabric outputs, and then sends the packet to any available output in that subset.

Once the concurrent packets received at the interconnect fabric inputs 101–108 during a particular time slot are routed through the interconnect fabric and received by their respective output packet switches 110–113, the interconnect fabric 109 is cleared and awaits the arrival of packets during the next time slot. Further, the output packet switches are each responsible for routing the received packets to their destined switch outputs; i.e. 114–115 of output packet switch 110, based upon the destination address in each packet, and in accordance with any standard packet switching technique of the prior art. If more than four packets arrive simultaneously at interconnect fabric inputs 101–108 which are destined for outputs of the same output packet switch, all those in excess of four will be discarded by the interconnect fabric because, as shown in FIG. 1, each output packet switch can only accept a maximum of four simultaneous packets, one at each of its inputs. The method of determining which packets to discard will be discussed later herein.

If packets arrive independently at interconnect inputs 101–108, the probability of packet loss is given by:

$$Pr(\text{packet loss}) = \frac{1}{p}\sum_{k=j+1}^{N}(k-j)\begin{bmatrix}N\\k\end{bmatrix}\left[\frac{p}{.V}\right]^{k}\left[1-\frac{p}{.V}\right]^{.V-k} \quad (1)$$

where p is the loading; i.e. the probability that a packet arrives during a given slot at a given interconnect fabric input. Further, it can be shown that as N. . .> ∞, the probability of packet loss becomes $$Pr(\text{packet loss}) = \left[1-\frac{j}{p}\right]\left[1-\sum_{k=0}^{j}\frac{p^k e^{-p}}{ki}\right]+\frac{p^j e^{-p}}{\Lambda} \quad (2)$$

For example, using a 1000×2500 interconnect fabric constructed with twenty groups of fifty interconnect fabric outputs each, the packet loss probability is less than $10^{-8}$, assuming that [p≦0.9] $p \leqq 0.9$. The packet loss probability is normally acceptable in most practical systems, but can be adjusted in accordance with the particular system requirements of the user and the above equations, which can easily be programmed into any computer to yield a solution.

Figure 2:
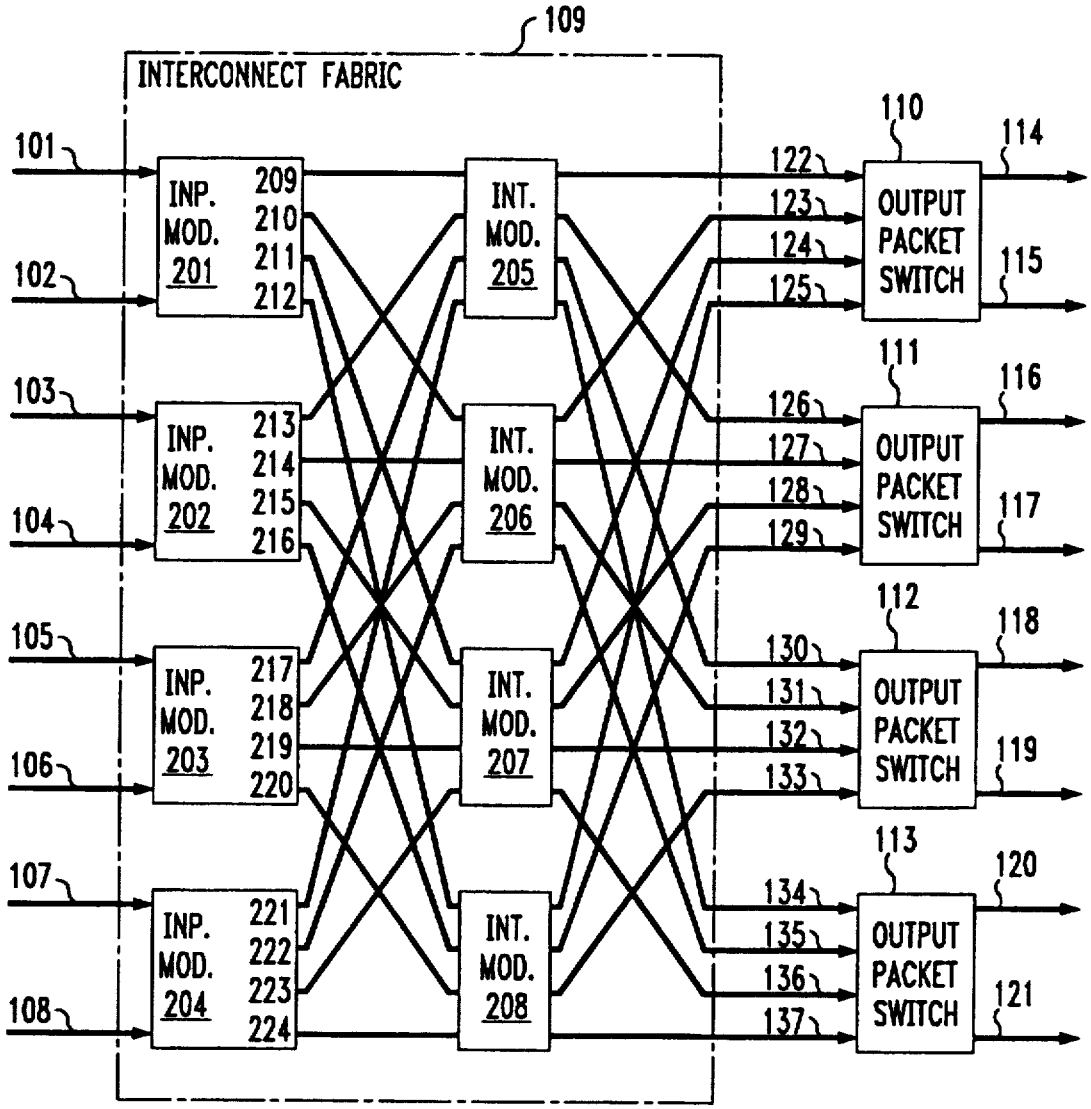
FIG. 2 shows a block diagram of an exemplary embodiment of the inventive interconnect fabric which can be used within the packet switching arrangement of FIG. 1.

FIG. 2 shows a block diagram of an exemplary interconnect fabric 109 in accordance with the invention, as well as the connections from the inventive interconnect fabric 109 to the output packet switches 110–113. The exemplary interconnect fabric 109 comprises four input modules 201–204, each comprising (1) two interconnect fabric inputs; i.e. 101 and 102 of input module 201, and (2) four input module outputs, i.e. 209–212 of input module 201. The interconnect fabric 109 further comprises four intermediate modules 205–208, each arranged to receive data packets from a separate output of each of input modules 201–204, and to transmit data to a separate output of interconnect fabric 109 corresponding to a separate input of each of output packet switches 110–113. For purposes of explanation, input module outputs 209–224 and output packet switch inputs 122–137 of FIG. 2 are collectively referred to herein as paths, since they are actually communications paths used to communicate packets from an input module to an output packet switch. Therefore, FIG. 2 comprises 32 paths, 16 first paths, labeled 122–137 and 16 second paths, labeled 209–224. The interconnect fabric 109 implements an efficient routing algorithm for conveying the packets from the input modules 201–204 to the output packet switches 110–113 through the use of the intermediate modules 205–208 and paths 209–224 and 122–137, as described hereinafter.

In operation of the routing algorithm, packets arrive simultaneously in a given time slot at the inputs 101–108 to the input modules 201–204. The time slot is broken down, internal to interconnect fabric 109, into M minislots, where M is equal to the number of input modules, plus a transmission slot to be explained later herein. Hereafter, careful attention should be given to the distinction between a time slot, during which several simultaneous packets arrive at the inputs 101–108 of interconnect fabric 109, and minislots, M of which comprise a time slot. During the f-trst minislot, a separate particular output packet switch is assigned to each input module. Each input module then examines the destination address in each packet received during the time slot and determines which packets are destined for the particular output packet switch assigned to the input module during that particular minislot. For example, during the first minislot, output packet switches 110–113 might be assigned to input modules 201–204, respectively. This would imply that during the first minislot, input module 201 would be examining its received packets to determine which ones, if any, are destined for output packet switch 110, or equivalently, which packets of the possible two that were received at interconnect fabric inputs 101 and 102, if any, are destined for switch outputs 114 or 115. Also during this first minislot, input module 202 would be determining which packets of those that arrived at interconnect fabric inputs 103 and 104 during the time slot are destined for output packet switch 111, or equivalently, which packets are destined for switch outputs 116 or 117. Input modules 203 and 204 would function similarly for their respective received packets and respective assigned output packet switches 112 and 113.

For each packet destined for the particular assigned output packet switch, each input module would reserve one of its associated paths; e.g. path 209 of input module 201, and a path associated with the particular output packet switch to which the packet is destined e.g. path 122 of output packet switch 110. Both reserved paths must be connected to the same intermediate module; i.e. paths 122 and 209 are both connected to the same intermediate module 205. The intermediate module is then responsible for providing a connection between the two paths for conveyance of the packet from the input module to the output packet switch during a subsequent minislot provided for packet transmission. At the end of the first minislot, each input module would store a small amount of data indicating which of its associated paths had been reserved in the first minislot. A record would also be made at the end of the first minislot, possibly at each output packet switch, of which particular paths 122–137, connecting the interconnect fabric to the four output packet switches, have been reserved.

During the next minislot of the same time slot, each output packet switch is assigned to a new input module. For example, the second minislot of the time slot could assign output packet switches 110, 111, 112, and 113 to input modules 202, 203, 204, and 201, respectively. Each output packet switch may have had some of its associated paths reserved from the first minislot, and the information as to which paths of an output packet switch have been previously reserved must be passed to the input module which is currently assigned to the output packet switch. Each input module already will have its own information indicative of which of its associated paths have previously been reserved, since each input module stores this information when it reserves one of its associated outputs. Thus, at the start of the second minislot, each input module will have (1) information indicative of which of its paths; e.g. 209–212 of input module 201, have been previously reserved, and (2) information indicative of which paths of the particular output packet switch it is assigned to, have also been previously reserved; e.g. which of paths 134–137 of output packet switch 113 were reserved by assigned input module 204 during the first minislot.

During the second minislot, each input module examines the packets received during the time slot, searching for packets that are destined for the new assigned output packet switch. For each packet found to be destined for the particular assigned output packet switch, each input module again reserves a set of paths, in a similar manner as before, with the added restraint that no previously reserved paths may be reused. At the end of the second minislot, the output packet switches will once again be reassigned, and the process will continue until each of output packet switches 110–113 has been assigned to each of input modules 201–204. At the beginning of each minislot, each input module will always contain a cumulative record of which of its paths, i.e. paths 209–212 of input module 201, have been reserved during previous minislots. Further, each input module will be passed a cumulative record of which paths of the output packet switch currently assigned to the input module have also been previously reserved by other input modules during previous minislots. At the conclusion of the fourth minislot, a transmission slot, briefly mentioned above, is reserved for transmission of the packets through interconnect fabric 109 via the previously reserved paths and for resetting the interconnect fabric to receive a new set of simultaneous packets during the next time slot.

Note that once an output path of an input module is reserved for a packet, this reservation, and an indicator of which minislot the system is in, will uniquely determine which of the output packet switch paths 122–137 must be reserved and the proper connection which must be made through the intermediate module. For example, and referring to FIG. 2, if input module 201 reserves path 209 during the first minislot, intermediate module 205 must connect path 209 to path 122. This is because during the first minislot, input module 201 is assigned to output packet switch 110. Therefore, it follows that if path 209 is reserved during the first minislot, it must be for conveyance of a packet to output packet switch 110 through intermediate module 205. But as FIG. 2 shows, path 122 is the only path to transmit data from intermediate module 205 to output packet switch 110. Therefore, the reservation of path 209 during the first minislot uniquely determines the connection which must be made at intermediate module 205. This concept can be extended to the case where multiple paths which are connected to the same intermediate module are reserved during a minislot. For example, if input module 201 reserved path 209 during the first minislot while input module 202 reserved path 213 during the first minislot, intermediate module 205 would connect paths 209 and 213 to paths 122 and 126, respectively. This is because the pairs of paths 209–122 and 213–126 form connections from input module 201 to output packet switch 110 and from input module 202 to output packet switch 111, respectively. Intermediate module 205 would know that the connection pairs 209–126 and 213–122 would be incorrect. This is because paths 209–126 would correspond to a connection from input module 201 to output packet switch 111, and paths 213–122 would correspond to a connection between input module 202 and output packet switch 110, both connections being inconsistent with the input module/output packet switch assignments for the first minislot. However, if during a future minislot, input modules 201 and 202 were assigned to output packet switches 111 and 110, respectively, and paths 209 and 213 were available and reserved during this future minislot, the connections 209–126 and 213–122, different from those above and corresponding to the different input module/output packet switch assignments than those discussed above, would be the correct connections. An exemplary circuit for doing this selective switching is detailed later herein.

Figure 3:
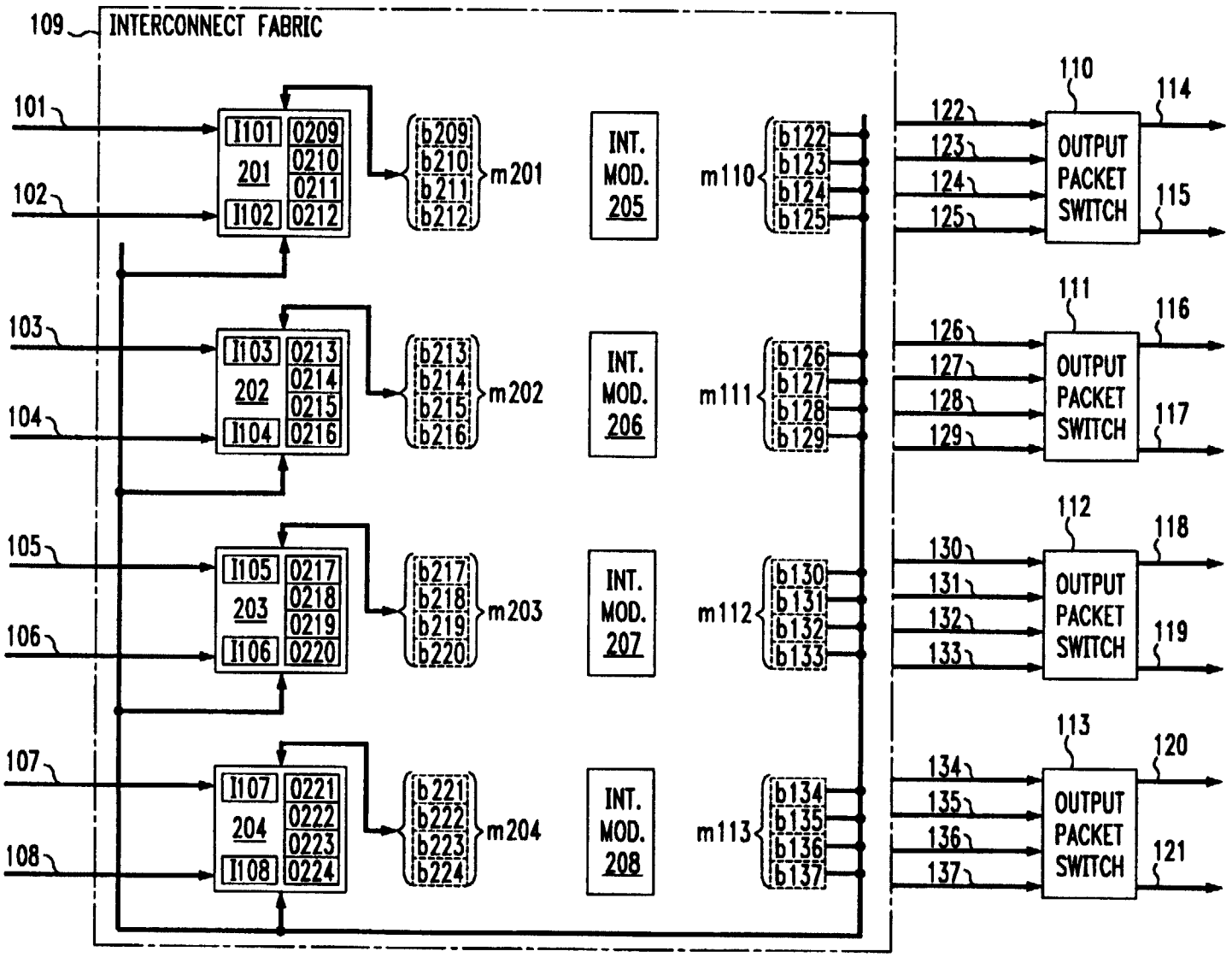
FIG. 3 shows a block diagram of a possible implementation of the exemplary interconnect fabric of FIG. 2.

One exemplary way to implement the described routing method, not to be construed as limiting the scope of the invention, is to have one or more small processors, possibly microprocessors, in the interconnect fabric 109, and reserve a four bit block of memory both for each of the input modules 201–204, and for each of the output packet switches 110–113. A block diagram of a portion of this exemplary implementation is shown in FIG. 3. Each of the memory blocks of FIG. 3 is labeled mxxx, where xxx is the input module or output packet switch to which the memory block corresponds. For example, m201 of FIG. 3 is the memory block which corresponds to input module 201 of FIG. 2. Each bit in each memory block represents a separate one of the communications paths from FIG. 2, and each bit of the memory blocks m110–m113 and m201–m204 of FIG. 3. is labeled to correspond to the communications path which it represents. Each input module comprises two input buffers, i.e. input buffers I101 and I102 of input module 201, to be used to buffer the arriving packets at the beginning of a time slot. Further, each input module comprises four output buffers; i.e. O209–O212 of input module 201. Each output buffer O209–O224 corresponds to a separate one of communications paths 209–224. The intermediate modules 205–208 are each arranged to monitor the status of any of the bits b2O-9–b224 of memory blocks m201–m204 which correspond to paths that terminate at the intermediate module. For example, intermediate module 205 is arranged to monitor the status of bits b209, b213, b217, and b221, since, as FIG. 2 shows, the paths corresponding to these bits are all connected to intermediate module 205. These monitoring connections are not shown in FIG. 3 for clarity.

At the start of a time slot, simultaneous packets arrive at interconnect inputs 101–108 and are read into input buffers I101–I108 of FIG. 3, respectively. Each input module is assigned a separate output packet switch 110–113 for the duration of the first minislot, and is thus arranged to read from, and write to, the proper one of memory blocks m110–m113 corresponding to the particular output packet switch assigned to the input module. If any of the packets in the input buffers of an exemplary input module are destined for the particular output packet switch assigned to that input module, the input module reserves a set of paths by complementing the corresponding bits of the appropriate memory blocks m201–m204 and m110–m113 of FIG. 3. The intermediate modules 205–208 then interpret the bits and connect the proper paths. For example, if input module 201 reserves paths 209 and 122 during an exemplary minislot, input module 201 would complement bits b209 and b122 in FIG. 3. Intermediate module 205, which monitors bit b209, would detect that it has been complemented during the minislot and would, therefore, connect paths 209 and 122 to each other. After reserving the paths by complementing the bits, the input module 201–204 places the packet to be transmitted over the reserved paths into the corresponding one of the output buffers O209–O224 of FIG. 3. As the packets are placed into output buffers O209–O224 during successive minislots of a time slot, there are fewer packets remaining in the input buffers, and there are fewer packets to examine during each successive minislot.

At the end of the first minislot, each input module is assigned a new output packet switch. This could be accomplished physically by implementing the memory blocks m110–m113 of FIG. 3 as a 16 bit shift register, and then cyclically shifting the shift register by four bits in either direction. After the shift, each input module 201–204 would be arranged to monitor the four bits previously monitored by a different input module. Further, each set of four bits b122–b125, b126–b129, b130–b133, and b134–b137, will have the reservations, i.e. complemented bits, from the previous input module(s) to which it was assigned. Thus, this shift register cyclic rotation provides a method to supply each input module with a cumulative record of which paths of the currently assigned output packet switch have been previously reserved by input modules to which the currently assigned output packet switch was previously assigned. The shift register approach could also be replaced, for example, with a computer bus. Referring to FIG. 3, all sixteen bits b122–b137 could be bussed to each of the input modules 201–204, and each input module could monitor a separate four bits during any minislot. When a new minislot begins, each input module 201–204 would switch over and monitor a different set of four bits chosen from b122–b137, corresponding to a different output packet switch assignment. Each input module can now continue reserving paths during each minislot by complementing bits. If too many packets arrive which are destined for a particular output packet switch, the interconnect fabric will run out of available paths to that output packet switch during a time slot. After the supply of paths is depleted, all other packets destined for that output packet switch during that time slot will be discarded. At the conclusion of the fourth minislot, the packets are conveyed to the output packet switches via the previously reserved paths during the transmission slot, all the memory blocks are reset to their inactive state, and the interconnect fabric is ready to accept packets in the next time slot.

A slight inefficiency exists in the routing algorithm which should be noted. As described above, when an input module output and an output packet switch input are reserved for a packet, both must be connected to the same intermediate module. This translates into a very specific requirement on the exemplary memory block implementation of FIG. 3. More particularly, it means that the bit position reserved in the memory block m20l–m204 corresponding to the input module must be the same as the bit position reserved in the memory block m110–m113 corresponding to the currently assigned output packet switch. For example, to convey an exemplary packet from input module 201 to output packet switch 110, any of the bit pairs b209–b122, b210–b123, b211–b124, or b212–b125 of FIG. 3 would suffice, assuming that none of the corresponding paths have been previously reserved. Note that b209 and b122 are both in the first position of their respective memory blocks m201 and m110. Similarly, b210 and b123 are both in the second position of their respective memory blocks m201 and m110. The other bit pairs discussed above have the same property. Because of this requirement, it is possible that for a given input module/output packet switch assignment during a particular minislot, several paths could be available from the input module and several paths could be available to the output packet switch but packets between the two are still lost. This situation would occur if none of the paths available from the input module are connected to the same intermediate module as the available output packet switch paths are connected to. For example, and referring to FIG. 2, suppose during the third minislot input module 201 is assigned to output packet switch 112. Further assume that during previous minislots paths 209 and 131–133, among others, have been reserved for transmission of packets through the interconnect fabric. FIG. 2 shows that although output packet switch 112 still has an associated path 130 available i.e. not previously reserved, and further, input module 201 still has paths 210 through 212 available, no connection can be made through the interconnect fabric of FIG. 2 from input module 201 to output packet switch 112 because the available path 130 of output packet switch 112 is not connected to the same intermediate module as any of the available paths 210–212 of input module 201. This packet loss probability is in addition to the packet loss probability yielded by the previous equations (1) and (2), which is due to more than four packets arriving at the interconnect fabric inputs 101–108 which are destined for the same output packet switch. However, even with this extra packet loss probability, the probability that a packet will not be lost is approximately 98% to 99% of the number given by the above equations, and is therefore still acceptable in most practical systems.

Figure 4:
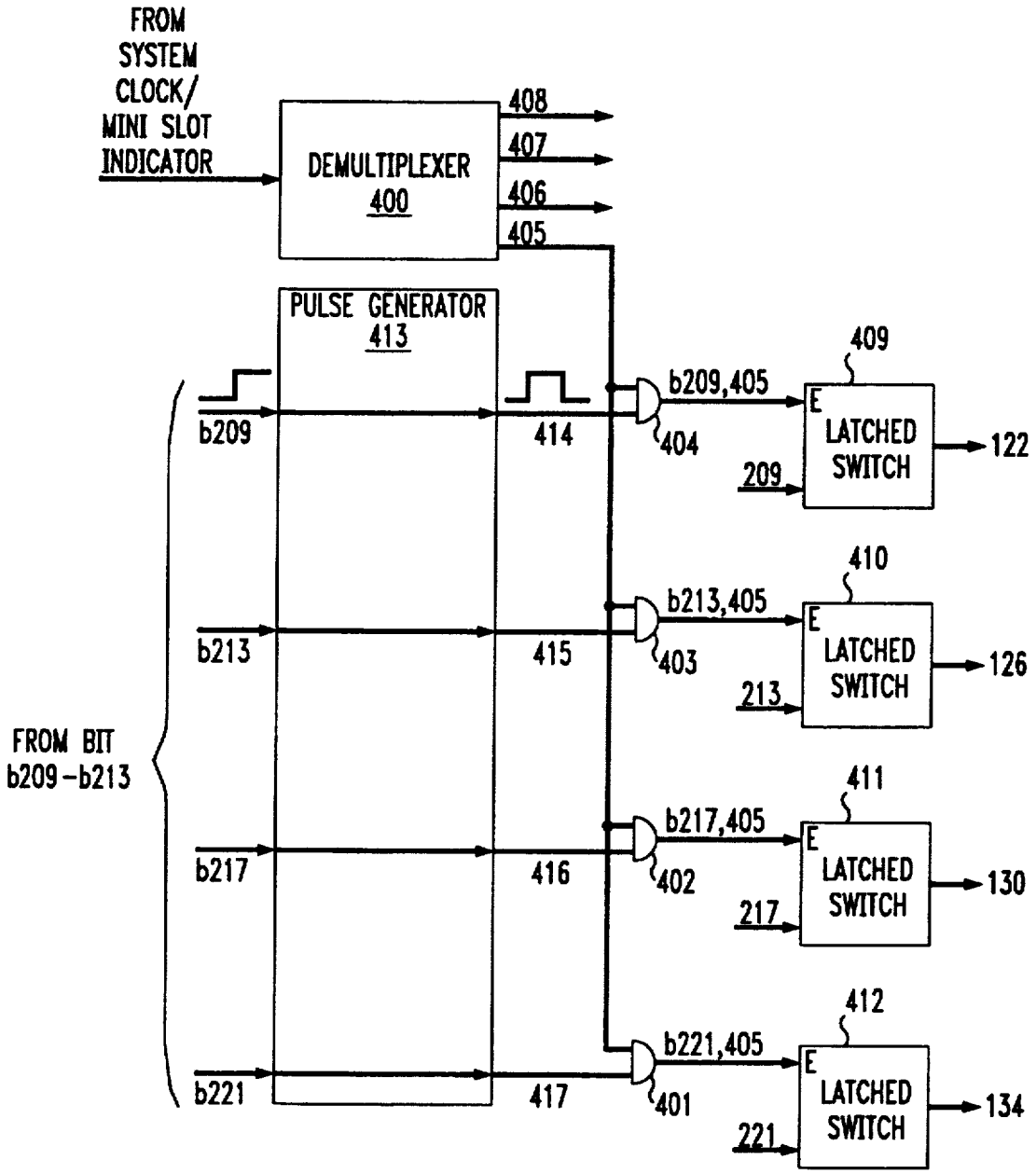
FIG. 4 shows portions of exemplary hardware for use in the exemplary interconnect fabric of FIG. 2.

A block diagram of a portion of an exemplary logic circuit for implementing the functions of exemplary intermediate module 205 is shown in FIG. 4. It is to be understood that FIG. 4 shows only the portion of logic circuitry required to implement the first minislot within each intermediate module. Further, FIG. 4 is shown only for illustrative purposes, and is not to be construed as limiting the scope of the invention. A Demultiplexer 400 interprets the system clock, or a minislot indicator timing signal supplied by the system clock, and selectively sets active one of the output lines 405–408 which is enabled to indicate the proper minislot. For example, during the first minislot, line 405 goes active, enabling logic gates 401–404. If any one or more of the bits b209, b213, b217, or b221 have been set active by an input module, the corresponding output 414–417 from pulse generator 413 will generate a one minislot wide pulse, and the output from the corresponding logic gate 401–404 will be activated. This activated output will then enable the proper one or more latched switches 409–412, by setting active the input E of the latched switches 409–412. The outputs from logic gates 401–404 are connected to latched switches 412–409, respectively. This activation of the E bit on any one or more of latched switches 409–412 will cause the input of the latched switch to be connected to the corresponding output 122, 126, 130, or 134, providing the connection between the two paths originally reserved by the input module. This connection will remain as set by the logic for the entire time slot, so that the packets can all be conveyed through the interconnect fabric at the end of the time slot. Not shown are the reset inputs to the latched switches 409–412, used for resetting the latched switches after transmission of the packets through the interconnect fabric at the end of the time slot.

Figure 5:
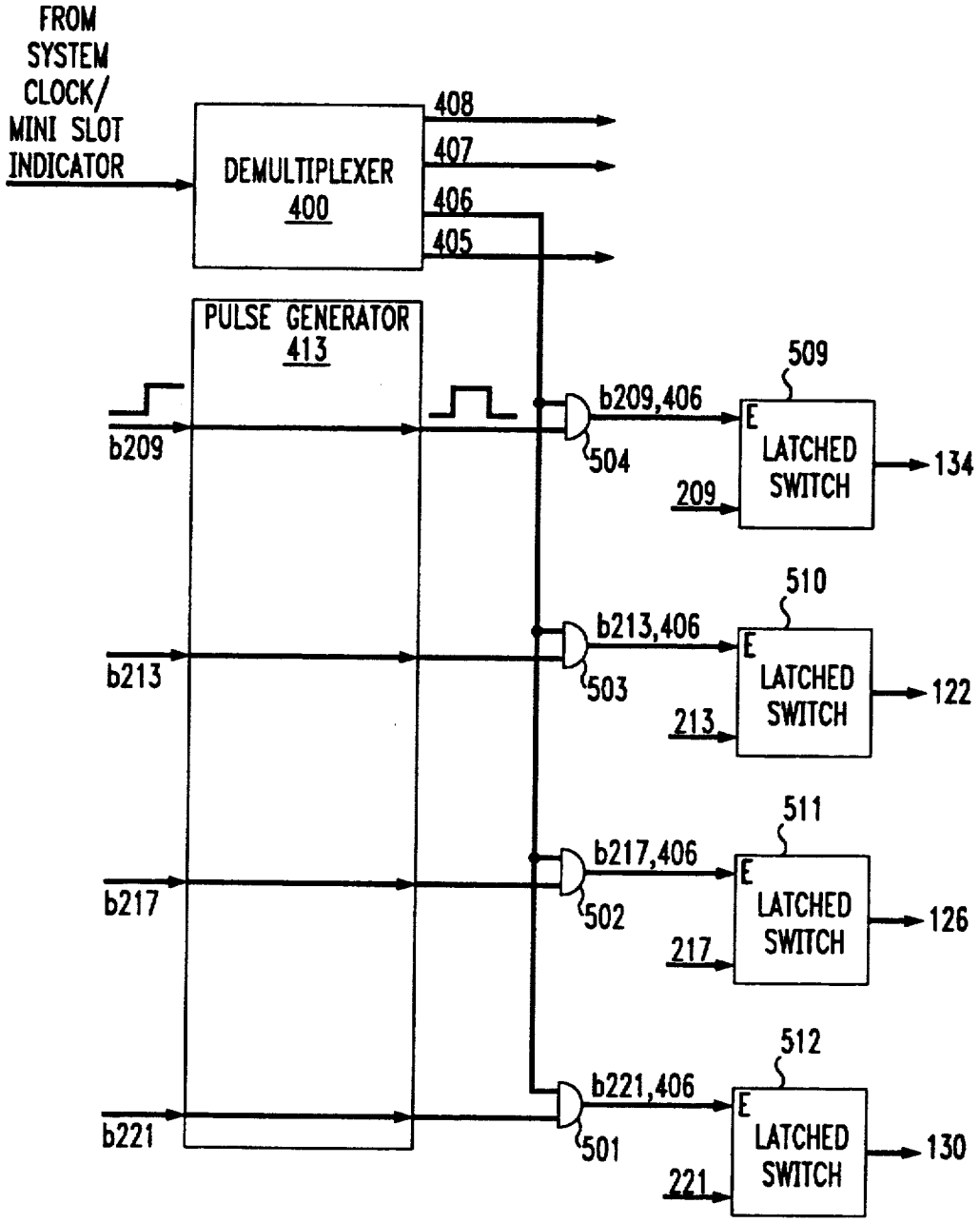
FIG. 5 shows further portions of exemplary hardware for use in the interconnect fabric of FIG. 2.

For operation during each of the remaining three minislots, a set of gates analogous to gates 401–404 would be utilized. FIG. 5 shows a second portion of the exemplary circuit of intermediate module 205, this second portion being for possible use during a second minislot. Note that demultiplexer output 406 of FIG. 5 is asserted active during the second minislot, enabling a different set of gates 501–504 instead of the set 401–404 enabled during the first minislot. Further, note that inputs and outputs to latched switches 409–412 of FIG. 4 are paired together differently than the inputs and outputs to latched switches 509–512, of FIG. 5 corresponding to the different input module/output packet switch assignments. FIG. 5 shows that if a bit b209, b213, b217, or b221 goes active during the second minislot, gates 501–504 will complete the corresponding connection from paths 209–134, 213–122, 217–126 or 221–130, through the proper one of switches 509–512. Note that once a bit b209, b213, b217, or b221 is set active, and the minislot signal is provided, the circuitry of FIGS. 4 and 5 can provide the proper connections through the intermediate module. As was emphasized previously, once the input module path is selected and the minislot is known, this determines the output packet switch path which must also be reserved.

A different strategy for implementing the connections through the intermediate modules 205–208 is based upon self routing the packets during each time slot rather than establishing connections through the intermediate modules 205–208 as described in FIGS. 4 and 5. Referring to FIG. 3, in the self routing method, after activating the proper bits to reserve the required paths, each input module would place the packets in the output buffers O209–O224 as described above. However, in the self-routing method, no switches within the intermediate module exist. Rather, each packet contains a field of one or more bits, denoted herein as the "route" field, which the input module 201–204 sets, and which specifies the particular one of paths 122–137 of FIG. 2 to which the intermediate module should route the packet to. At the end of the minislots, the packets are transmitted to the intermediate modules, which interpret the route field and transmit the packets over the proper one of paths 122–137 as specified in the route field of each packet.

It is to be understood that the exemplary circuitry shown in each of FIGS. 4 and 5 is not to be construed as limiting the spirit or scope of the invention. The entire intermediate module could be implemented as any combination of hardware and software, or with other hardware arrangements than those of FIG. 4 or 5 which can be easily constructed by anyone of ordinary skill in the art. The entire set of intermediate modules 205–208 could be replaced by a smaller number of larger intermediate modules, say two $8\times8$ modules, rather [that] *than* the four $4\times4$ intermediate modules shown. The memory blocks m201–m204 could be eliminated, and the input modules 201–204 could examine their own output buffers O209–O224 to determine which paths 209–224 have been previously reserved. More particularly, if path 219 were reserved by input module 203, for example, the packet to be transmitted over the path would be loaded into output buffer O219 as described above. Therefore, in a future minislot, rather than check to see if b219 were set as was previously described, input module 203 could just check its output buffer O219 of FIG. 3 and if the buffer is loaded, it would indicate that path 219 has been previously reserved.

Still further embodiments of the invention are possible and easily implementable by anyone of ordinary skill in the art. The interconnect fabric 109 could begin routing the packets at the end of each minislot, rather than waiting until the end of the entire time slot. The input modules could begin accepting a new set of packets while transmitting the set from the previous time slot. The number of inputs J to each output packet switch 110–113 or the number of outputs from each input module 201–204 need not be the same. Further, one or more of the output packet switches may only have one input. If it is known in advance that much of the traffic is destined for a particular output packet switch, for example, this output packet switch could have more inputs than the rest of the output packet switches. There also need not be the same number of input modules as output packet switches, and the intermediate modules could have different numbers of inputs and outputs from each other. Further, one or more intermediate modules could be arranged for use by only specified input modules, rather than all of the input modules, thereby permitting higher priority for packets arriving at these specified input modules.

The interconnect fabric can be generalized even more to handle a mix of packet and circuit traffic. Suppose we desire to provide a circuit connection from an arbitrary interconnect fabric input, say 101, to an any interconnect fabric output of an arbitrary group of interconnect fabric outputs, say 122–125 of FIG. 1, for transmission of a digital bit stream. The interconnect fabric could, at the beginning of each time slot, reserve a path from interconnect fabric input 101 to interconnect fabric output 122, for example, before the reservation algorithm described herein begins to reserve paths. Thus, during each time slot, a set of paths connecting interconnect input 101 to interconnect fabric output 122, for example, paths 210 and 123 of FIG. 2, would be off limits to the reservation algorithm, and would be reserved for circuit traffic. Any block of data which arrived at interconnect fabric input 101 during the time slot would be sent to interconnect fabric output 122, without examining an address within that block of data. If the required speed of the circuit connection were lower than the rate at which the interconnect fabric accepts packets, say one third as fast, than the block of data arriving during every third time slot could be processed as circuit traffic, while the two in between time slots would be available for normal data packets. Furthermore, the block of data, being part of a bit stream to be transmitted over a circuit connection, may not even contain an address.

These blocks of data are designated herein as exception data packets, and are to be understood to be encompassed by the term data packet. The only difference between the processing of these exception data packets and the data packets previously described above is: (1): that the mapping discussed herein is based upon the time slot during which the exception packet arrives and the interconnect fabric input at which the exception packet arrived, rather than an address in the packet, and (2) the exception packets may be routed to a single output rather than a group of outputs. Finally, a plurality of inputs 101–108, during various time slots, could be reserved for transmission of these blocks of data. This simply means that during predetermined time slots, predetermined ones of bits b209–b224 and b122–b137 would be complimented at the beginning of the time slot, and thus off limits to all normal data packets.

The lost packet probability can be made even smaller by the use of extra buffering within the interconnect fabric. More particularly, rather than discard all packets for which there are no available paths during a time slot, one could buffer the excess packets until a subsequent time slot, when paths from the input module at which the packets were received to destination output packet switch for the buffered packets become available. This method however, may not be cost effective because the probability of packet loss can be made so small without the extra buffering. One or more of the output packet switches could be replaced with a computer, multiplexer, or other digital device, allowing the inventive interconnect fabric to be utilized in other types of systems than just packet switches.

We claim:

[1. An interconnect fabric comprising:

a plurality of input ports for receiving data packets, a plurality of groups of output ports, each group comprising a separate number of one or more output ports, where the separate number of output ports comprised in a group of output ports may be the same as or different from the number of output ports comprised in other groups of output ports, at least one of the groups comprising more than one output port, means for mapping each received data packet to a group of output ports, and means for discarding, or storing until a subsequent time slot, those data packets received during a given time slot and in excess of the separate number of output ports comprised in a group of output ports for which those packets are destined.]

[*2. An interconnect fabric according to claim 1 wherein the mapping means comprises:* means for establishing a separate communications path from each separate input port at which each data packet is received to a separate output port of the group of output ports to which the data packet is mapped, and transmitting each data packet over a separate established communications path.]

[3. An interconnect fabric according to claim 1 or 2 wherein said mapping means further comprises:

(a) a plurality of input modules, each input module comprising (1) at least one input, each input being coupled to a separate interconnect fabric input port, (2) a plurality of outputs, and (3) means for selectively connecting any input to any output for forming a first portion of the established communications path for each data packet;

(b) a plurality of intermediate modules, each intermediate module comprising (1) a plurality of inputs, where each input is coupled to a separate input module output, (2) a plurality of outputs, each output being coupled to a separate interconnect fabric output port of a predetermined number of groups of interconnect fabric output ports, and (3) means for selectively connecting any intermediate module input to any intermediate module output for forming a second portion of the established communications path for each data packet.]

[4. An interconnect fabric according to claim 1 or 2 wherein said means for establishing and transmitting further comprises:

(a) a plurality of input modules, each input module comprising (1) at least one input, each input being coupled to a separate interconnect fabric input port, (2) a plurality of outputs, and (3) means for selectively connecting any input to any output for forming a first portion of the established communications path for each data packet;

(b) a plurality of intermediate modules, each intermediate module comprising (1) a plurality of inputs, where each input is coupled to a separate input module output, (2) a plurality of outputs, each output being coupled to a separate interconnect fabric output port of a predeter-mined number of groups of interconnect fabric output ports. and (3) means for selectively connecting any intermediate module input to any intermediate module output for forming a second portion of the established communications path for each data packet.]

5. [In an interconnect fabric comprising a plurality of interconnect fabric input ports, each input port being arranged for receiving data packets concurrent with data packets being received at others of the plurality of interconnect fabric input ports, and a plurality of groups of output ports, each group comprising a separate number of output ports, where the separate number of output ports comprised in a group of output ports may be the same as or different from the number of output ports comprised in other groups of output ports, at least one group of output ports comprising a plurality of output ports, a method of conveying each packet received at an interconnect fabric input port to an available interconnect fabric output port of a group of output ports for which the packet is destined, comprising the steps of:

(a) mapping each received data packet to a destined group of output ports;

(b) establishing a separate communications path from each separate input port at which a data packet is received to a separate available output port of the destined group of output ports to which the data packet is mapped;

(c) transmitting each data packet over the separate established communications path; and (d) discarding, or storing until a later time slot, packets received during a given time slot in excess of the separate number of output ports comprised in a group of output ports to which the excess packets are mapped.]

[6. A method according to claim 5 wherein the plurality of interconnect fabric input ports are arranged into separate groups of one or more interconnect fabric input ports: in step (a), performing the steps of;

(a1) assigning each group of interconnect fabric input ports to a separate group of interconnect fabric output ports, (a2) determining which data packets received at each group of interconnect fabric input ports are destined for the separate group of interconnect fabric output ports assigned in step (a1), (a3) reserving a separate previously unreserved communications path between an interconnect fabric input post of each group of interconnect fabric input ports and its assigned group of interconnect fabric output ports from step (al) for each packet determined in step (a2) to be destined for the assigned group of interconnect fabric output ports, (a4) assigning each group of interconnect fabric inputs to a separate different group of interconnect fabric output ports and repeating steps (a2) and (a3), (a5) reiterating step (a4) until each group of interconnect fabric input ports has been assigned to each group of interconnect fabric output ports.]

7. A method according to claim [6] *2* wherein said interconnect fabric comprises a plurality of input modules, and a plurality of intermediate modules, each intermediate module being arranged to receive data from at least one input module via at least one first communications path, and to transmit the received data to at least one of the groups of interconnect fabric output ports via at least one second communications path, wherein step (a3) includes:

reserving a previously unreserved first communications path to a particular intermediate module and reserving a previously unreserved second communications path from that same intermediate module to the assigned group of interconnect fabric output ports.

*8. An interconnect fabric comprising:*

*a plurality of input ports for receiving data packets;*

*a plurality of groups of output ports, each group comprising a separate number of one or more output ports, each of said output ports for supplying data packets as an output and each output port of a particular group being assigned to a common destination which is different from a destination assigned to output ports of at least another group, where the separate number of output ports comprised in a group of output ports may be the same as or different from the number of output ports comprised in other groups of output ports, at least one of the groups comprising more than one output port; and* means for mapping each received data packet to a group of output ports and for mapping concurrently received data packets destined for a particular one of said destinations to respective output ports in a particular group assigned to the particular destination, said meawns for mapping including means for establishing a separate communications path from each separate input port at which each data packet is received to a separate output port of the group of output ports to which the data packet is mapped and for transmitting each data packet over the separate established communications path, *(a) a plurality of input modules, each input module comprising (1) at least one input, each input being coupled to a separate interconnect fabric input port, (2) a plurality of outputs and (3) means for selectively connecting any input to any output for forming a first portion of the established communications path for each data packet, (b) a plurality of intermediate modules, each intermediate module comprising (1) a plurality of inputs, each input is coupled to a separate input module output, (2) a plurality of outputs, each output being coupled to a separate interconnect fabric output port of a predetermined number of groups of interconnect fabric output ports, and (3) means for selectively connecting any intermediate module input to any intermediate module output for forming a second portion of the established communications path for each data packet.*

*9. An interconnect fabric as defined in claim 8 wherein said plurality of input ports includes a first number of input ports and said plurality of output ports includes a second number of output ports larger than said first number of input ports.*

*10. An interconnect fabric as defined in claim 9 wherein said data packets are transported through said interconnect fabric on a circuit switched basis.*

*11. An interconnect fabric as defined in claim 8 further including means for discarding those data packets received during a current time slot and in excess of the separate number of output ports comprised in a particular group of output ports for which those excessive packets are destined.*

*12. An interconnect fabric as defined in claim 8 further including means for storing until a subsequent time slot, those data packets received during a current time slot and in excess of the separate number of output ports comprised in a particular group of output ports for which those excessive packets are destined.*

*13. An interconnect fabric comprising:*

*a plurality of input ports for receiving data packets;*

*a plurality of groups of output ports, each group comprising a separate number of one or more output ports, each of said output ports for supplying data packets as an output and each output port of a particular group being assigned to a common destination which is different from a destination assigned to output ports of at least another group, where the separate number of output ports comprised in a group of output ports may be the same as or different from the number of output ports comprised in other groups of output ports, at*

*least one of the groups comprising more than one output port; and*

*means for mapping each received data packet to a group of output ports and for mapping concurrently received data packets destined for a particular one of said destinations to respective output ports in a particular group assigned to the particular destination, said means for mapping including means for establishing a separate communications path from each separate input port at which each data packet is received to a separate output port of the group of output ports to which the data packet is mapped and for transmitting each data packet over the separate established communications path, said means for establishing and for transmitting including (a) a plurality of input modules, each input module comprising (1) at least one input, each input being coupled to a separate interconnect fabric input port, (2) a plurality of outputs, and (3) means for selectively connecting any input to any output for forming a first portion of the established communications path for each data packet, and (b) a plurality of intermediate modules, each intermediate module comprising (1) a plurality of inputs, where each input is coupled to a separate input module output, (2) a plurality of outputs, each output being coupled to a separate interconnect fabric output port of a predetermined number of groups of interconnect fabric outputs and (3) means for selectively connecting any intermediate module input to any intermediate module output for forming a second portion of the established communications path for each data packet.*

*14. In an interconnect fabric comprising a plurality of interconnect fabric input ports, each input port being arranged for receiving data packets concurrent with data packets being received at others of the plurality of interconnect fabric input ports and being arranged into separate groups of one or more input ports, and a plurality of groups of output ports, each of said output ports for supplying data packets as an output, each group comprising a separate number of output ports and each output port of a particular group being assigned to a common destination which is different from a destination assigned to output ports of at least another group, where the separate number of output ports comprised in a group of output ports may be the same as or different from the number of output ports comprised in other groups of output ports, at least one group of output ports comprising a plurality of output ports, a method of conveying each packet received at an interconnect fabric input port to an available interconnect fabric output port of a group of output ports for which the packet is destined, comprising the steps of:*

*(a) mapping each received data packet to a destined group of output ports and mapping concurrently received data packets destined for a particular one of said destinations to respective output ports of a particular group assigned to said particular destination;*

*(b) establishing a separate communications path from each separate input port at which a data packet is received to a separate available output port of the destined group of output ports to which the data packet is mapped; and*

*(c) transmitting each data packet over the separate established communications path for it, the step (a) including*

*(a1) assigning each group of interconnect fabric input ports to a separate group of interconnect fabric output ports,*

*(a2) determining which data packets received at each group of interconnect fabric input ports are destined for the separate group of interconnect fabric output ports assigned in step (a1),*

*(a3) reserving a separate previously unreserved communications path between an interconnect fabric input port of each group of interconnect fabric input ports and its assigned group of interconnect fabric output ports from step (a1) for each packet determined in step (a2) to be destined for the assigned group of interconnect fabric output ports,*

*(a4) assigning each group of interconnect fabric inputs to a separate different group of interconnect fabric output ports and repeating steps (a2) and (a3),*

*(a5) reiterating step (a4) until each group of interconnect fabric input ports has been assigned to each group of interconnect fabric output ports. ports and said plurality of output ports includes a second number of output ports larger than said first number of input ports.*

*15. A method as defined in claim 14 wherein said plurality of input ports includes a first number of input ports and said plurality of output ports includes a second number of output ports larger than said first number of input ports.*

*16. A method as defined in claim 15 wherein said data packets are transported through said interconnect fabric on a circuit switched basis.*

*17. A method as defined in claim 14 further including the step of discarding those data packets received during a current time slot and in excess of the separate number of output ports comprised in a particular group of output ports for which those excessive packets are destined.*

*18. A method as defined in claim 14 further including the step of storing until a subsequent time slot, those data packets received during a current time slot and in excess of the separate number of output ports comprised in a particular group of output ports for which those excessive packets are destined.*

* * * * *